Sept. 2, 1947.   F. W. JURY   2,426,774
GEAR CUTTING MACHINE
Original Filed Oct. 25, 1939   4 Sheets-Sheet 1
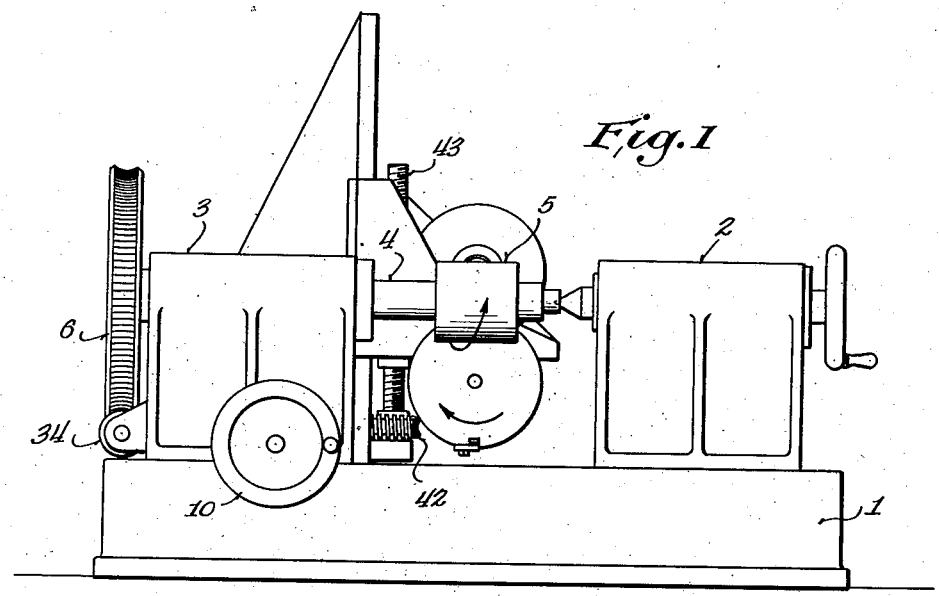
Fig.1
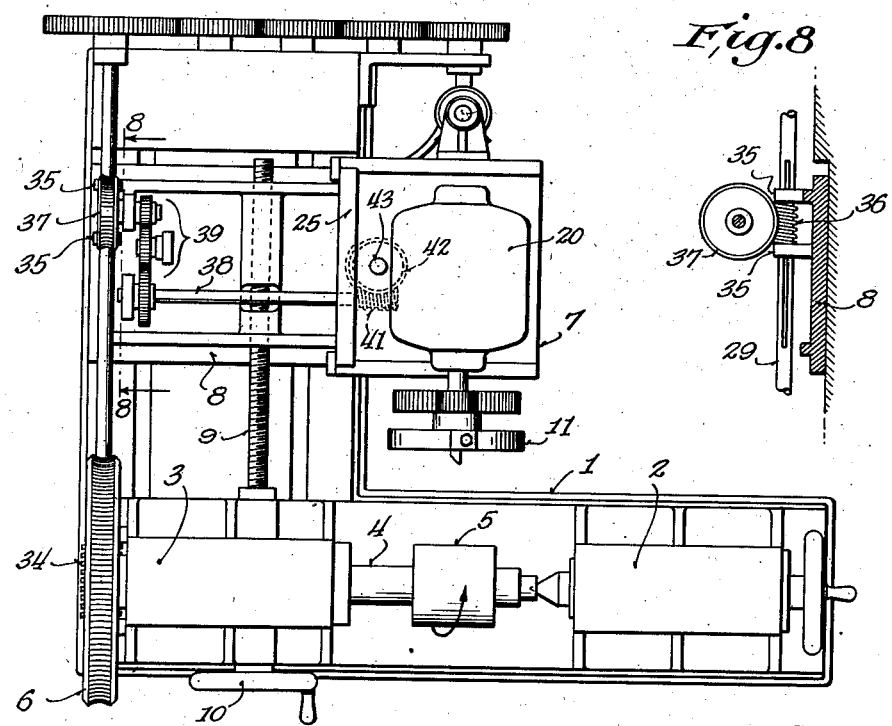
Fig.2
Fig.8
INVENTOR.
FRANK W. JURY
BY
Arthur R. Woolfolk
ATTORNEY.

Sept. 2, 1947.  F. W. JURY  2,426,774
GEAR CUTTING MACHINE
Original Filed Oct. 25, 1939  4 Sheets-Sheet 2

INVENTOR.
FRANK W. JURY
BY
ATTORNEY.

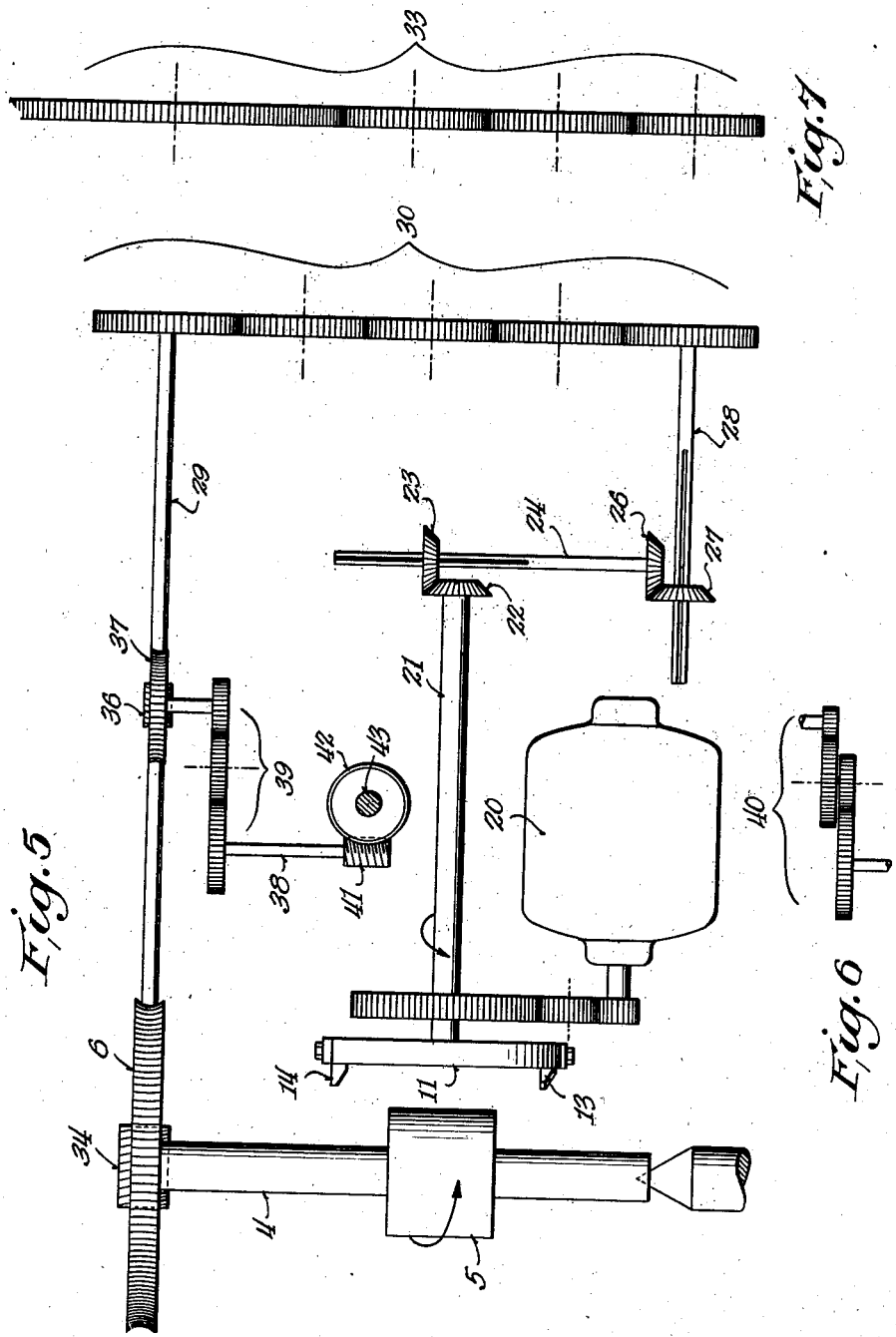

Sept. 2, 1947.　　　　　F. W. JURY　　　　　2,426,774
GEAR CUTTING MACHINE
Original Filed Oct. 25, 1939　　　4 Sheets-Sheet 4
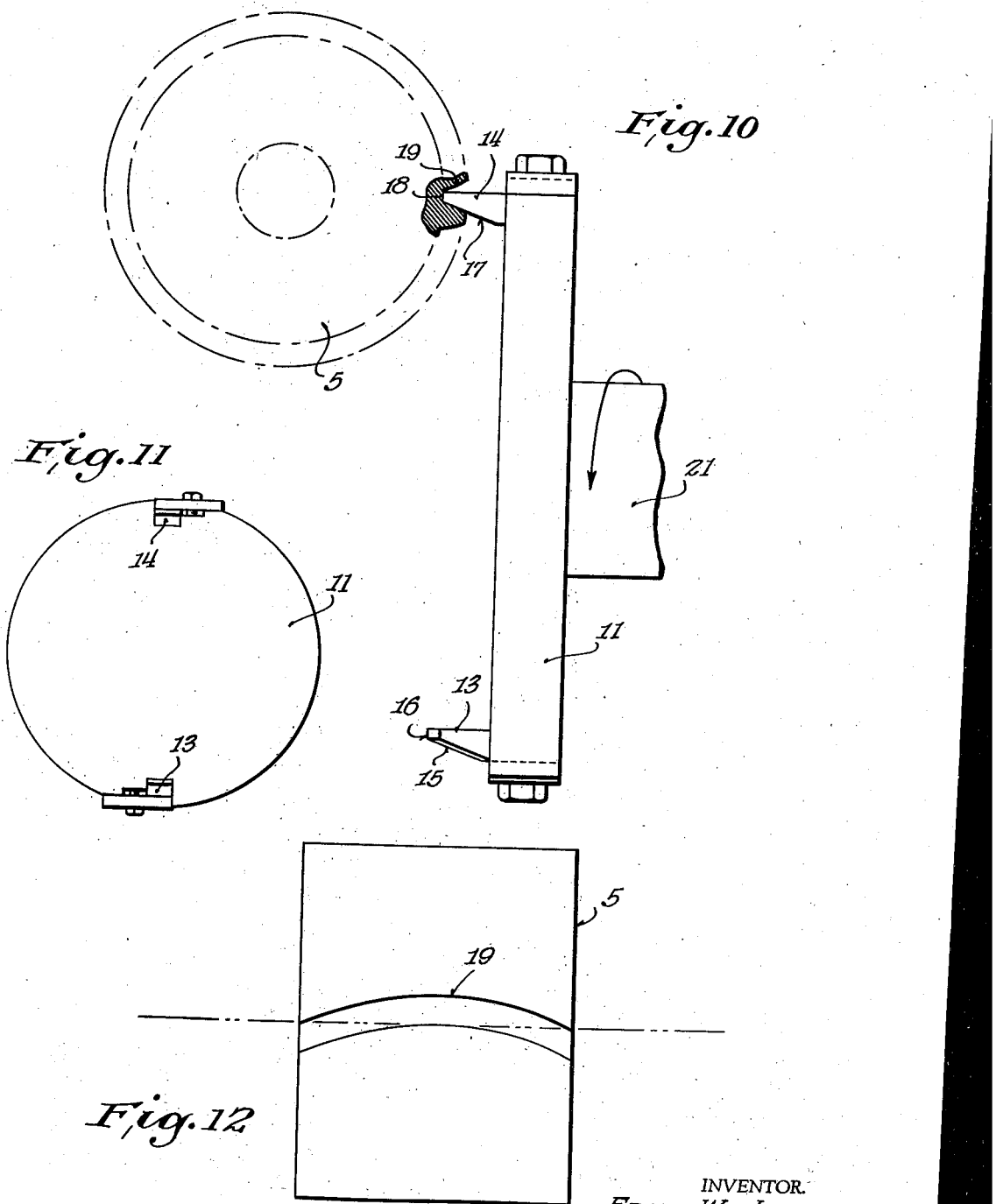
INVENTOR.
FRANK W. JURY
BY
Arthur R. Woodfork
ATTORNEY.

Patented Sept. 2, 1947

2,426,774

UNITED STATES PATENT OFFICE 2,426,774

GEAR CUTTING MACHINE

Frank W. Jury, Milwaukee, Wis.

Continuation of application Serial No. 301,100, October 25, 1939. This application November 25, 1943, Serial No. 511,673

11 Claims. (Cl. 90—5)

This invention relates to a gear cutting machine and to the method of cutting gears.

This application is a continuation of my prior application for gear cutting machine and method of cutting gears Serial No. 301,100 filed October 25, 1939.

Objects of this invention are to provide a novel form of machine and a novel method of cutting substantially circular teeth in a continuous manner and imparting continuous uniform rotation to the gear blank and continuous uniform rotation to the cutter, and at the same time imparting to the cutter a continuous bodily movement so that the substantially circular gear teeth are generated teeth and are completely finished after the cutter has made one complete travel from one side of the gear blank to the other side of the gear blank.

Further objects are to provide a simple type of gear cutting machine for cutting substantially circular teeth which is rapid in its operation and does not require the sudden stopping or starting of any part of the machine, but in which the cutting progresses in a continuous, uninterrupted manner from the beginning to the completion of the cutting operation for all of the teeth of the gear.

Further objects are to provide a gear cutting machine and a method of cutting gears by means of cutter teeth whose cutting faces are straight, the teeth themselves being generated by the relative motion of the parts.

Further objects are to provide a gear cutting machine in which the rate of feed or rate of cutting can be adjusted to suit the particular speed of cutting to the particular material that is used in the gear blank, so that the speed of operation of the machine is limited solely by the surface speed of cutting, as in a lathe or planer, or any other machine of this type.

It is to be noted that in this machine the blank is rotating continuously while the cutter continuously rotates and simultaneously travels bodily from one side of the gear blank to the other, for example, from below the gear blank to above the gear blank, while the gear blank rotates continuously about a horizontal axis. It is apparent that the teeth will depart slightly from a circular shape for two reasons: one, that the upward bodily travel of the cutter while it is rotating and the downward travel of the adjacent face of the blank cause the teeth to deviate slightly from a circular shape, and also because of the fact that the circular cutter has a slight upward component on one side of the gear blank and a slight downward component on the other side of the blank due to the rotation of the cutter and the simultaneous rotation of the gear blank, and thus there is a little greater rate of travel between the gear blank and a cutter tooth on one side than on the other.

This invention, however, has for its further object the cutting of complementary teeth on the two gears which are to mesh so that this deviation from a circular shape is accurately compensated for by forming the teeth of the meshing gears with complementary curves.

Therefore, a further object of the invention is to provide means for reversing the relative direction of rotation of the cutter and gear blank for the second gear to thereby cause the teeth of the second gear to mesh accurately with and to be complementary of the teeth of the first gear.

Further objects are to provide a machine for cutting substantially circular teeth on gears, while the gear blank and cutter are continuously rotating and while the cutter is advancing in a plane parallel to the axis of rotation of the gear blank, and to provide means including change gear mechanism whereby the change gear train ratio compensates for the bodily travel of the cutter during the rotation of the blank without requiring any auxiliary mechanism to effect this compensation.

Further objects are to provide a gear cutting machine having the characteristics hereinabove enumerated in which two change gear trains are provided, one of which determines the rate of advance or feed of the cutter and the other of which determines the pitch of the teeth so that the machine may be easily adjusted for any desired pitch and may also be easily adjusted to secure the most advantageous rate of cutting for the particular material of which the gear blank is formed.

An embodiment of the invention is shown in the accompanying drawings, in which:

Figure 1 is a rear end view of the machine.

Figure 2 is a plan view thereof.

Figure 5 is a diagrammatic view showing the gear train drives for the several parts of the machine.

Figures 6 and 7 show gear trains which may be used interchangeably with the gear trains shown in Figure 5.

Figure 8 is a fragmentary view corresponding approximately to a section on the line 8—8 of Figure 2.

Figure 10 is a view showing the relation of the cutter to a gear blank.

Figure 11 is a face view of a cutter.

Figure 12 is a diagrammatic view showing the face of a gear blank with a single slot between gear teeth drawn in the position it would approximately occupy to show the slight deviation from a perfectly circular tooth slot.

Figure 3:
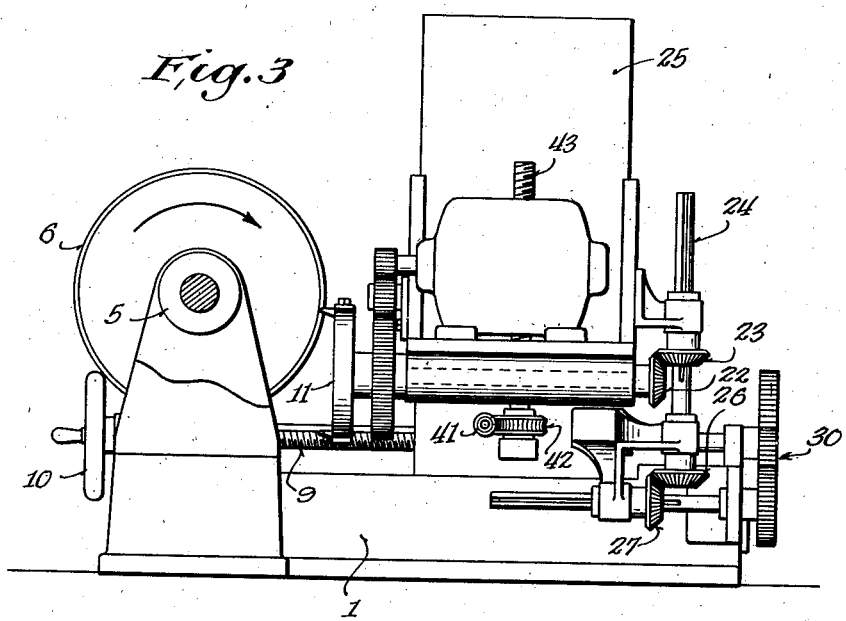
Figure 3 is a side view of the machine from the left-hand side of Figure 2.
Figure 4:
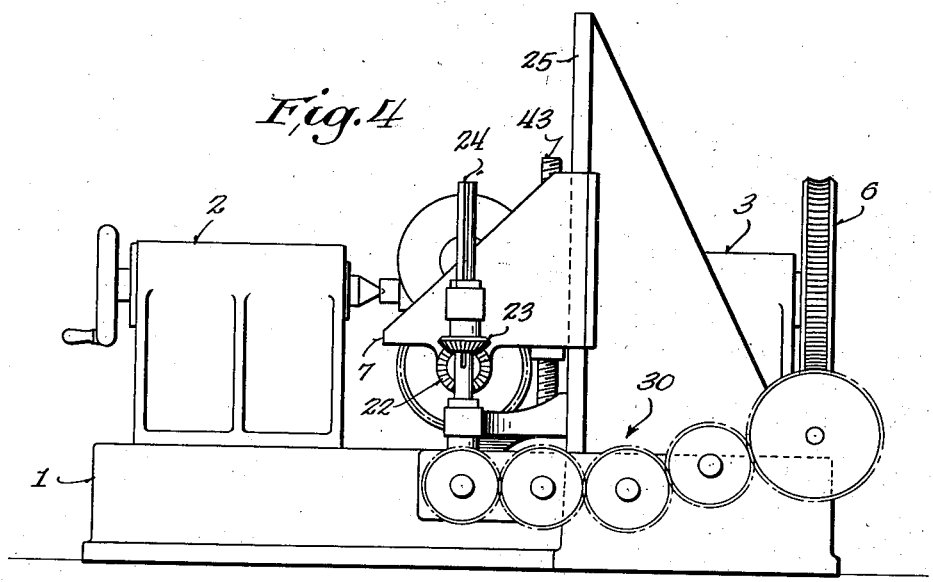
Figure 4 is a front end view of the machine.

Referring to the drawings, it will be seen that the machine comprises a body portion or bed 1 provided with a tailstock indicated generally at 2 and a headstock indicated generally at 3. The headstick is adapted to receive and drive an arbor or mandrel 4 upon which the gear blank 5 is mounted. The mandrel 4 is driven from a worm wheel 6. A cutter assembly is mounted in front of the gear blank, as shown in Figure 2, and may comprise a frame or supporting portion 7 which is supported from a slide 8. The slide 8 may be moved towards or from the gear blank by means of the screw 9 operated by a hand wheel 10 so that the cutter head 11 may be initially moved into its correct position for the particular size of gear blank to be cut. Thereafter this adjustment towards or from the gear blank is not varied during the entire cutting operation.

The cutter head 11 may comprise a disk as shown in Figure 10, which is removably carried by the shaft 21 in any suitable manner not shown, and removably receives the cutting tools 13 and 14. These cutting tools have straight cutting edges. The cutting edges for the tool 13 are indicated at 15 and 16 and the cutting edges for the tool 14 are indicated at 17 and 18.

The mechanism is so arranged that the cutter head rotates in the direction indicated in Figure 10 and each tooth passes successively through the same slot which is formed by the tools in the gear blank 5. Two or more tools may be used. In the form shown, two tools have been indicated.

In the operation of the machine a gear blank is mounted on the mandrel 4 and the slide 8, see Figure 2, is adjusted so that the cutter is in correct position with respect to the gear. At the start of the cutting operation the cutter is positioned below the gear as shown in Figure 1, and during the cutting operation the cutter rotates as indicated in Figure 1 and the cutter assembly slowly rises, the cutter, however, remaining in the same vertical plane during the entire operation. The gear blank 5 is rotated so that its face presented towards the cutter is traveling downwardly and the cutter, therefore, cuts out the substantially circular teeth, one of the slots being indicated by the reference character 19 in the diagrammatic view shown in Figure 12.

The teeth are not exact circles for the reason that the peripheral face of the gear blank adjacent the cutter is traveling downwardly, while on one lateral side the tools of the cutter are traveling upwardly and on the other lateral side the tools of the cutter are traveling downwardly, and there is thus a slight difference in the relative velocity of the gear blank and the tools where they engage the gear blank on opposite lateral sides thereof. Additionally there is the low upward travel of the cutter assembly during the cutting operation, which also causes a slight deviation from a true circle for the teeth. As a consequence of this, the two meshing gears are cut so that their teeth are complementary. This is accomplished by reversing the direction of rotation of the cutter while maintaining the same direction of rotation of the gear blank. Of course, the cutting edges of the tools for cutting the complementary teeth are on the opposite side from that shown in Figure 10 as the direction of rotation of the cutter head has been reversed.

The cutter head starts at a point below the gear blank and is not fed inwardly towards the gear blank during the entire cutting operation for a single gear blank. It rises slowly while the cutter head rapidly rotates and while the gear blank rotates. All three of these motions are continuous and uniform and consequently, though straight cutting edges are provided on the tools of the cutter, nevertheless the gear teeth cut in the blank are accurately generated gear teeth. It is apparent that as the cutter head slowly rises, that it cuts all of the teeth completely around the gear blank due to the rotation of the gear blank and the slow rise of the cutter head. This cutting is gradual and all of the teeth are cut completely around the gear blank to progressively increasing depth as the cutter head rises and passes across the gear blank from a position below the blank to a position above the blank. While the direction of travel of the cutter head has been described as from below to a position above the gear blank, it is obvious that the cutter head could travel from above to a position below the gear blank. It would be preferable under these conditions to reverse the rotation of the gear blank.

The entire mechanism may be driven from a single reversible electric motor 20 which is mounted on the support or frame 7 and forms a portion of the cutter head assembly. Through reduction gearing, as shown in Figure 5, the motor 20 drives the cutter shaft 21. The end of the cutter shaft 21 is provided with a bevel gear 22 which meshes with a bevel gear 23 splined on a slotted vertical shaft 24, see Figures 3 and 5, the bevel gear 23 being held by a suitable bracket as indicated in Figure 3 and traveling upwardly or downwardly with the cutter head assembly. The means for guiding the cutter head assembly for its vertical motion may comprise a vertical guide 25 forming a unitary structure with the slide 8. The support 7 is guided by the guide 25 and is moved directly upwardly or downwardly by means hereinafter described.

The vertical shaft 24 carries a bevel gear 26 which meshes with the bevel gear 27 splined on a slotted horizontal shaft 28. The bevel gears 26 and 27 travel with the slide 8, see Figures 3 and 5.

Figure 9:
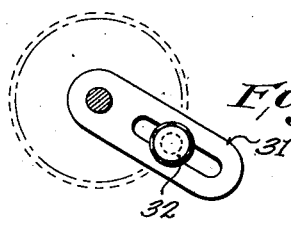
Figure 9 is a detail view showing a supporting means that may be employed for supporting one of the gears of a gear train.

The shaft 29, see Figure 5, is driven by change gear mechanism indicated generally at 30, the end gears being removably carried by the shafts 28 and 29 and the intermediate gears being carried in any suitable and conventional manner, as by means of the adjustable slotted links or supports 31 which are removably and adjustably locked to the body portion by means of bolts 32, see Figure 9. Any other conventional way of carrying the intermediate gears of the change gear train can be employed.

It is obvious that when the direction of rotation of the cutter head is reversed with reference to the gear blank by reversing the direction of rotation of the motor 20, that a different number of intermediate gears have to be carried in the gear train from that shown in Figure 5. For example as in Figure 5, three intermediate gears are employed, whereas upon reverse direction of rotation of the cutter head, a different number of intermediate gears are employed in the change gear train as indicated at 33 in Figure 7. In the case chosen for illustration, an odd number of gears is shown in Figure 5 and an even number of intermediate gears is shown in Figure 7. This arrangement causes the gear blank to rotate in the same direction although the direction of rotation of the cutter head has been reversed.

The shaft 29 carries a worm 34 which drives the worm wheel 6, see Figures 1 and 5.

The slide 8 is provided with a pair of upstanding lugs 35, see Figure 8, between which a worm wheel 36 is mounted. This worm wheel is slidably splined on the shaft 29 and drives a worm wheel 37. The worm wheel 37 drives the shaft 38 carried by the slide 8, see Figures 2 and 5. The drive from the worm wheel 37 to the shaft 38 is through the intermediate change gear train 39. If desired, any of the change gear trains 30, 33 or 39 may take the form shown diagrammatically in Figure 6 and indicated generally by the reference character 40. In other words, the change gear trains may have intermediate gears provided with a relatively large gear and a relatively smaller pinion rigid therewith as one portion of the intermediate gear train in accordance with the well known practice, and also it is obvious that any of the intermediate gears may be carried as indicated in Figure 9 wherever desirable.

The shaft 38 is provided with a worm 41 which drives a worm wheel 42 rigid with a vertical screw 43, see Figures 1, 2, 3 and 5. The screw 43 is arranged vertically and elevates the cutter assembly in a gradual and uniform manner while the machine is in operation.

The operation of the apparatus is briefly as follows:

The gear blank 5 is mounted on the mandrel 4 and the cutter assembly is adjusted inwardly by means of the hand wheel 10 and screw 9 until the teeth of the cutter head 11 are positioned in their correct relative spacing from the axis of the gear blank. At this time the cutter assembly is in a position below the gear blank. The appropriate gear trains are selected. The gear train 39 determines the rate of upward feed of the cutter head. Obviously, if the material is relatively hard, the upward rate of feed is slower than where the material is relatively softer. The factor which determines the rate of cutting will, of course, be similar to that which would determine the rate of cutting on a lathe or planer, namely, the surface speed and depth of cut of a tool operating on the particular material. For instance, the number of revolutions of the cutter may vary from 80 to 300 R. P. M. depending on the size of the cutter and the kind of material operated on. The speed is determined solely by the surface speed of cutting and the amount or depth of each cut of a tooth is determined by the rate of upward feed. When this has been determined, the proper gear train 39 can be chosen. The gear trains 30 and 33, Figures 5 and 7, are selected after the rate of feed has been determined and in conjunction with the gear train 39. For any given setting of the gear train 39, the selection of the gear trains 30 or 33 determines the pitch of the teeth cut on the gear blank.

It is obvious that inasmuch as the cutter assembly rises upwardly at a certain predetermined rate, depending on the selection of the gear train 39, that some means must be provided for compensating for the upward travel of the cutter assembly during the cutting operation. For example, if P equals the pitch of the teeth to be cut measured at the pitch line, and T equals the number of teeth, then $P \times T$ equals the periphery in inches at the pitch line. Assume that F equals the distance of vertical travel of the cutter for one revolution of the blank. Then $$\frac{P \times T}{F}$$

is equal to the number of revolutions of the blank while the cutter travels a distance equal to the periphery of the blank.

It is apparent, therefore, that a correction factor must be interposed in the gear train 30 or 33 or, in other words, the gear train 30 or 33 is so selected that one revolution less than the number of revolutions of the blank is imparted to the blank while the cutter travels a distance equal to the periphery of the blank. This may be written as follows:

$$\frac{P \times T}{F} - 1$$

It is therefore apparent that the gear train 30 or 33 must be corrected by the factor or correction ratio $$\frac{\frac{P \times T}{F} - 1}{\frac{P \times T}{F}}$$

To express this matter in other words, it is apparent that the total number of revolutions of the gear blank during the time that the cutter has traveled a vertical distance equal to the periphery at the pitch line of the gear blank is one less than the total number of revolutions of the gear blank, which would be necessary had the cutter stood still without any vertical rise whatsoever.

This invention, therefore, provides a very simple means of obtaining this result and it is secured without the use of any differential gearing or other complicated means, for example as has heretofore been employed in my prior Patent No. 1,456,240 of May 22, 1923 for Gear cutting machine.

In view of the fact that the number of teeth on the individual gears of the gear train 30 or 33 are necessarily whole numbers, it is apparent that it may become necessary to slightly alter the gear train 39 for certain pitches and for certain numbers of teeth to be cut on a gear blank. In view of the fact that there is a material range of speed of cutting that is permitted for any given material, it is obvious that this slight change in the gear train 39 may be made and still the cutting speed may be in the optimum zone of cutting speeds for the particular material of which the gear blank is composed, but this slight adjustment of the gear train 39 will obviously vary the value of F in the above formula and thus enable an operator to select the appropriate gears for the gear train 30 or 33.

It is apparent from the above description that a very simple type of gear cutting machine and a very simple method of cutting substantially circular teeth has been provided by this invention in which accurate meshing of the drive and driven gear cut by this machine is obtained by cutting the complementary teeth, as has been detailed hereinabove.

Also it will be seen that this machine enables the operator to rapidly cut the gears, for it is apparent that the cutter head may rotate at a high rate of speed, being limited solely by the surface speed of the cutter teeth for the particular material chosen for the gear blank. Also this high speed is obtained due to the fact that there is no reversal of parts, that is to say, there is no sudden stopping and starting of the cutters, as in my above noted prior patent. Instead of this, the cutter head rotates uniformly, the gear blank rotates uniformly, and the cutter assembly rises at a uniform rate, and thus high speed operation is obtained.

It will be seen further that the extreme simplicity of the machine enables it to be cheaply manufactured and also the construction of the machine is such that it may be ruggedly made, as the machine is free from complicated or delicate parts. Additionally, it is to be noted that the cutter tools themselves are easy to make as all of their cutting edges are straight.

Although this invention has been described in considerable detail, it is to be understood that such description is intended as illustrative rather than limiting, as the invention may be variously embodied and is to be interpreted as claimed.

I claim:

1. A machine for cutting substantially circular teeth on gears which are adapted to mesh with the substantially circular teeth of one gear formed as complements of the substantially circular teeth of the other gear, said machine comprising blank rotating means, a rotary cutter, means for bodily moving the cutter in a plane parallel to the axis of rotation of the blank while the blank executes a large number of revolutions, means for rotating the cutter and the blank and for reversing the relative direction of rotation of the cutter and the blank for cutting complementary teeth, said last mentioned means including a change gear train whose ratio compensates for the bodily travel of the cutter by rotating said blank at a rate to produce during the bodily travel of said cutter through a distance equal to the pitch circumference of the gear being cut a total number of revolutions of said blank differing by one from the number of revolutions of said blank which would have occurred had there been no bodily motion of the cutter.

2. A machine for cutting substantially circular teeth on gears which are adapted to mesh with the substantially circular teeth of one gear formed as complements of the substantially circular teeth of the other gear, said machine comprising blank rotating means, a rotary cutter, means for bodily moving the cutter in a plane parallel to the axis of rotation of the blank while the blank executes a large number of revolutions, means for rotating the cutter and the blank and for reversing the relative direction of rotation of the cutter and the blank for cutting complementary teeth, said last mentioned means including reversible power means and including a change gear train whose ratio compensates for the bodily travel of the cutter by rotating said blank at a rate to produce during the bodily travel of said cutter through a distance equal to the pitch circumference of the gear being cut a total number of revolutions of said blank differing by one from the number of revolutions of said blank which would have occurred had there been no bodily motion of the cutter.

3. A machine for cutting substantially circular teeth on gears which are adapted to mesh, with the substantially circular teeth of one gear formed as complements of the substantially circular teeth of the other gear, said machine comprising blank rotating means, a rotary cutter, means for bodily moving the cutter in a plane parallel to the axis of rotation of the blank while the blank executes a large number of revolutions, means for continuously rotating the cutter at a uniform rate of speed and for continuously rotating the blank at a uniform rate of speed for one gear and for reversing the relative direction of rotation of the cutter and the blank for cutting the complementary gear, said last mentioned means including a change gear train whose ratio compensates for the bodily travel of the cutter by rotating said blank at a rate to produce during the bodily travel of said cutter through a distance equal to the pitch circumference of the gear being cut a total number of revolutions of said blank differing by one from the number of revolutions of said blank which would have occurred had there been no bodily motion of the cutter.

4. A machine for cutting substantially circular teeth on gears which are adapted to mesh, with the substantially circular teeth of one gear formed as complements of the substantially circular teeth of the other gear, said machine comprising blank rotating means, a rotary cutter, means for bodily moving the cutter in a plane parallel to the axis of rotation of the blank while the blank executes a large number of revolutions, means for continuously rotating the cutter at a uniform rate of speed and for continuously rotating the blank at a uniform rate of speed for one gear and for reversing the relative direction of rotation of the cutter and the blank for cutting the complementary gear, said last mentioned means including reversible power means and including a change gear train whose ratio compensates for the bodily travel of the cutter by rotating said blank at a rate to produce during the bodily travel of said cutter through a distance equal to the pitch circumference of the gear being cut a total number of revolutions of said blank differing by one from the number of revolutions of said blank which would have occurred had there been no bodily motion of the cutter.

5. A machine for cutting substantially circular gear teeth comprising means for rotating a gear blank, a rotary disk like cutter, means for rotating said disk like cutter about an axis at right angles to said disk like cutter, said disk like cutter having a plurality of teeth projecting outwardly from said disk like cutter and approximately paralleling the axis of rotation of said disk like cutter, means for bodily moving the cutter in a plane parallel to the axis of rotation of the blank in a continuous manner while said blank is continuously rotating at a uniform rate such as to produce during said bodily movement of the cutter through a distance equal to the pitch circumference of the gear being cut a total number of revolutions of said blank differing by one from the total number of revolutions of said blank which would have occurred had there been no bodily movement of said cutter, and means for varying the rate of feed of said disk like cutter.

6. A machine for cutting substantially circular gear teeth comprising means for rotating a gear blank, a rotary disk like cutter, means for rotating said disk like cutter about an axis at right angles to said disk like cutter, said disk like cutter having a plurality of teeth projecting outwardly from said disk like cutter and approximately paralleling the axis of rotation of said disk like cutter, means for bodily moving the cutter in a plane parallel to the axis of rotation of the blank in a continuous manner while said blank is continuously rotating at a uniform rate such as to produce during said bodily movement of the cutter through a distance equal to the pitch circumference of the gear being cut a total number of revolutions of said blank differing by one from the total number of revolutions of said blank which would have occurred had there been no bodily movement of said cutter, and adjusting means for selecting the particular plane along which said disk like cutter will move.

7. A machine for cutting substantially circular teeth on gear blanks comprising a body portion, means for rotating a gear blank, a slide carried by said body portion, adjustable means for moving said slide towards and from said gear blank, a right angle guide carried by said slide, a rotary cutter adjustably supported from said right angle guide, means for continuously rotating said cutter, and means for continuously moving said cutter with reference to said right angle guide while said gear blank continuously rotates at a uniform rate such as to produce during said bodily movement of the cutter through a distance equal to the pitch circumference of the gear being cut a total number of revolutions of said blank differing by one from the total number of revolutions of said blank which would have occurred had there been no bodily movement of said cutter.

8. A machine for cutting substantially circular teeth comprising a body portion, means supported from said body portion for rotating a gear blank continuously at a uniform rate, a guide formed on said body portion, a slide carried by said guide and adapted to be moved towards and from said gear blank, a vertical guide carried by said slide, a cutter assembly guided by said vertical guide, elevating means for raising said cutter assembly, said cutter assembly including a cutter, and power means for rotating said cutter and said gear blank and for vertically moving said cutter assembly a linear distance equal to the pitch circumference of the gear being cut while the blank executes a total number of revolutions one less than the number of revolutions of the blank which would have occurred had there been no bodily movement of the cutter.

9. A machine for cutting substantially circular teeth comprising a body portion, means supported from said body portion for rotating a gear blank at a uniform rate, a guide formed on said body portion, a slide carried by said guide, manual means for adjusting said slide towards and from said gear blank, a vertical guide carried by said slide, a cutter assembly guided by said vertical guide, elevating means for raising said cutter assembly, said cutter assembly including a cutter, and power means for rotating said cutter and said gear blank and for vertically moving said cutter assembly a linear distance equal to the pitch circumference of the gear being cut while the blank executes a total number of revolutions one less than the number of revolutions of the blank which would have occurred had there been no bodily movement of the cutter.

10. A machine for cutting substantially circular teeth on gear blanks comprising means for revolubly supporting a gear blank and for continuously rotating said gear blank at a uniform rate, a cutter assembly movable towards and from said gear blank, guiding means for guiding said cutter assembly for vertical motion, elevating means for raising and lowering said cutter assembly, said cutter assembly including a revolubly mounted cutter, power means for rotating said cutter, a change gear train operatively positioned between the support for said gear blank and said revoluble cutter, and a change gear train driven from said power means for vertically moving said cutter assembly a linear distance equal to the pitch circumference of the gear being cut while the blank executes a total number of revolutions one less than the number of revolutions of the blank which would have occurred had there been no bodily movement of the cutter.

11. A machine for cutting substantially circular teeth on a gear blank comprising a main body portion, means supported from said body portion for revolubly supporting a gear blank, a longitudinally extending shaft geared to the gear blank supporting means for rotating said gear blank supporting means, a slide carried by said body portion and adjustable towards and from said gear blank, a vertical guide carried by said slide, a cutter assembly guided by said vertical guide, elevating mechanism for said cutter assembly, change gear mechanism carried by said slide and operatively connected to said shaft irrespective of the position of said slide, said cutter assembly including a revoluble cutter, power means carried by said cutter assembly for rotating said cutter, and change gear mechanism connecting said power means and said revolubly mounted cutter with said shaft.

FRANK W. JURY.

REFERENCES CITED

The following references are of record in the file of this patent:

UNITED STATES PATENTS

| Number | Name | Date |
|---|---|---|
| 858,081 | Liggett | June 25, 1907 |
| 2,059,613 | Schellens | Nov. 3, 1936 |
| 1,709,835 | Bottcher | Apr. 23, 1929 |

FOREIGN PATENTS

| Number | Country | Date |
|---|---|---|
| 331,973 | Great Britain | July 17, 1930 |